(12) United States Patent
Peng et al.

(10) Patent No.: US 6,895,055 B2
(45) Date of Patent: May 17, 2005

(54) BIT-RATE GUIDED FREQUENCY WEIGHTING MATRIX SELECTION

(75) Inventors: Shaomin Peng, Yorktown Heights, NY (US); Mihaela van der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 759 days.

(21) Appl. No.: 10/039,686

(22) Filed: Oct. 29, 2001

(65) Prior Publication Data

US 2003/0081673 A1 May 1, 2003

(51) Int. Cl.[7] .......................... H04N 7/12; H04N 11/02
(52) U.S. Cl. ............................. 375/240.18; 375/240.03
(58) Field of Search ...................... 375/240.01, 240.02, 375/240.03, 240.04, 240.12, 240.18

(56) References Cited

U.S. PATENT DOCUMENTS

2003/0058936 A1 * 3/2003 Peng et al. ............ 375/240.03

OTHER PUBLICATIONS

"The MPEG–4 fine–grained scalable video coding method for multimedia streaming over IP"□□Radha et al.; Multimedia, IEEE Transactions on , vol.: 3 , Issue: 1 , Mar. 2001 pp.: 53–68□□.*

"Scene–dependent Frequency Weighting for Subjective Quality Improvement of MPEG–4 Fine–Granularity–Scalability", Proceed. 2002 International Conf. on Image Processing (Cat. No. 02CH37396), Proceed. of ICIP 2002 International Conf. on Image Processing, Rochester, NY, US, Sep. 22–25, 2002, XP002242635.

"Adaptive Frequency Weighting for Fine–Granularity–Scalability", Visual Communications and Image Processing 2002, San Jose, CA, US, Jan. 22–23, 2002, vol. 4671, pt. 1–2, pp. 840–849, XP008017524.

* cited by examiner

*Primary Examiner*—Chris Kelley

(57) ABSTRACT

A system and method for generating a frequency weighted (FW) matrix for use in a Fine-Granularity-Scalability (FGS) video coding system. The system comprises: a system for plotting the average discrete cosine transform (DCT) residuals versus the zigzag DCT scan line locations for a sample video frame encoded both at a predetermined base layer bit-rate and at approximately three times the predetermined base layer bit-rate; a system for generating the difference plot of DCT residuals versus the zigzag DCT scan line locations for the video frame encoded at both the predetermined base layer bit-rate and at approximately three times the predetermined base layer bit-rate; and a system for matching and normalizing a staircase curve to the average difference plot, wherein the staircase curve values can be further mapped into the weights for the FW matrix.

22 Claims, 7 Drawing Sheets

BIT-RATE GUIDED FREQUENCY WEIGHTING MATRIX SELECTION

BACKGROUND OF THE INVENTION

1. Technical Field

The present invention relates generally to scaling of encoded video, and more particularly relates to a system and method for selecting a frequency weighting (FW) matrix for a system implementing Fine-Granularity-Scalability (FGS) technology.

2. Related Art

The Fine-Granularity-Scalability (FGS) coding profile was adopted as part of the MPEG-4 standard in March 2001. The MPEG-4 FGS profile encodes a video sequence into two bit streams with different transmission priorities that can accommodate a large range of bit-rates: the base layer (BL) video stream and the enhancement layer (EL) video stream. The BL is coded using the MPEG-4 non-scalable coding scheme that employs motion-compensation and block-based DCT (discrete cosine transform) coding. The BL is coded to an acceptable minimal bit-rate (the base-layer bit-rate), such that the available bandwidth over the time-varying network is higher than the base-layer bit-rate. The EL codes the difference between the original and the BL signals in the DCT-domain using bit-plane coding.

At the enhancement layer encoder side, these DCT-residual bit-planes are compressed in a progressive (fine-granular) manner, from the most significant bit-plane (MSB) to the least significant bit-plane (LSB). Then, at transmission time, depending on the bandwidth available through the network or decoder capability, only part of the EL may be transmitted. FGS technology is especially useful for video streaming over networks with varying bandwidth, such as Internet video streaming, Internet broadcasting, wireless video communication for both cellular and in-home networks, etc.

FGS consists of a rich set of video coding tools that support various scalability structures and enhance the output visual quality. Frequency weighting (FW) is one such tool that is especially useful for improving visual quality for low bit-rate coding. For example, it is commonly known that the base layer DCT coefficients generally distribute their energy along the zigzag scan line from the top left to the bottom right of the DCT block. Accordingly, the enhancement layer DCT residual blocks inherit a similar zigzag energy distribution pattern. Hence, to ensure good coding quality for lower bandwidth restrictions, the higher energy residuals need to be transmitted in a prioritized manner. The FW method allows bit-plane shifting of selected EL DCT residuals. Therefore, a "frequency weighting" matrix, $M_{fw}$, of the same size as the DCT residual block is defined where each element $M_{fw}(i)$ of the matrix indicates the number of bit-planes that the ith DCT-coefficient should be shifted by.

FIG. 3 illustrates the benefit of FW at low bit-rates. On the left-hand side, the DCT residuals (depicted as vertical lines) of an EL block are shown for the case FW is not used and on the right-hand side, the DCT residuals of an EL block are shown for the case FW is used. As can be seen, each EL block includes several bit-planes, with the MSB located at the top. Within the planes, DCT coefficient residuals extend upward toward the MSB. In the left-hand case, at low bit-rates, if all the bit-planes below the MSB are truncated at the server, the decoder will not receive the DCT coefficient residuals in the first quadrant of the EL block. For most video sequences, the lower accuracy of the DC and first AC's EL residuals translates in a reduced visual quality at the decoder side. Alternatively, if an FW matrix is used where the first quadrant in the DCT block has $M_{fw}(i)=2$, as shown in the right-hand side, the DC and first AC's EL residuals will be successfully coded into the MSB, thereby guaranteeing their (at least partial) transmission even at low bit-rates.

Similar to other video coding standards, MPEG-4 standardizes only the FW syntax and its associated semantic meaning for the decoder. Hence, it is the task of the system designer to define innovative algorithms that use the FW syntax in such a manner that the visual quality of the FGS codec can be considerably improved. To achieve FW for FGS coding, one of the key steps is the FW matrix selection. One could select a generic FW matrix based on the zigzag energy distribution characteristics by giving the lower frequency coefficients higher weights and vice versus. However, the generic energy dissipation guideline cannot provide hints for determining the exact quantitative values of the FW matrix. Accordingly, a need exists for effectively selecting an FW matrix.

SUMMARY OF THE INVENTION

The present invention addresses the above-mentioned problem, as well as others, by providing a novel FW matrix selection method using BL DCT residual difference at critical quality bit-rates. In a first aspect, the invention provides a system for generating a frequency weighting (FW) matrix for use in a Fine-Granularity-Scalability (FGS) video coding system, comprising: a system for generating average discrete cosine transform (DCT) residuals for a sample video frame encoded both at a predetermined base layer bit-rate and at approximately three times the predetermined base layer bit-rate; a system for plotting a difference curve of the generated average DCT residuals, wherein the difference curve is plotted by DCT coefficient locations corresponding to a DCT zigzag scan line; and a system for matching a staircase curve to the difference curve.

In a second aspect, the invention provides a method of generating a frequency weighting (FW) matrix for use in a Fine-Granularity-Scalability (FGS) video coding system, comprising the steps of: generating a first plot of average discrete cosine transform (DCT) residuals versus zigzag DCT scan line locations for a sample video frame encoded at a first bit-rate; generating a second plot of average discrete cosine transform (DCT) residuals versus the zigzag DCT scan line locations for the sample video frame encoded at a multiple of the first bit-rate; generating a difference curve from the first and second plot; matching a staircase curve to the difference curve; and mapping weights of the staircase curve to populate the FW matrix.

In a third aspect, the invention provides a Fine-Granularity-Scalability (FGS) video encoding system that utilizes a frequency weighting (FW) matrix to encode video data, comprising: a system for determining a scene characteristic of the video data; and a system for selecting an FW matrix from a plurality of FW matrices based on the determined scene characteristic.

In a fourth aspect, the invention provides a program product stored on a recordable medium for generating a frequency weighting (FW) matrix for use in a Fine-Granularity-Scalability (FGS) video coding system, the program product comprising: means for generating a first plot of average discrete cosine transform (DCT) residuals versus zigzag DCT scan line locations for a sample video frame encoded at a first bit-rate; means for generating a second plot of average discrete cosine transform (DCT) residuals versus zigzag DCT scan line locations for the sample video frame encoded at a multiple of the first bit-rate; means for generating a difference curve of the first and second plot; means for matching a staircase curve to the difference curve; and means for populating the FW matrix with weights mapped from the staircase curve.

In a fifth aspect, the invention provides a Fine-Granularity-Scalability (FGS) video decoding system that utilizes a frequency weighting (FW) matrix to decode encoded video data, wherein weights for the FW matrix are determined from a staircase curve match of the difference of the average discrete cosine transform (DCT) residuals calculated at a base layer bit-rate and approximately three times the base layer bit-rate for a sample video frame.

BRIEF DESCRIPTION OF THE DRAWINGS

An exemplary embodiment of the present invention will hereinafter be described in conjunction with the appended drawings, where like designations denote like elements, and.

DETAILED DESCRIPTION OF THE INVENTION

Figure 1:
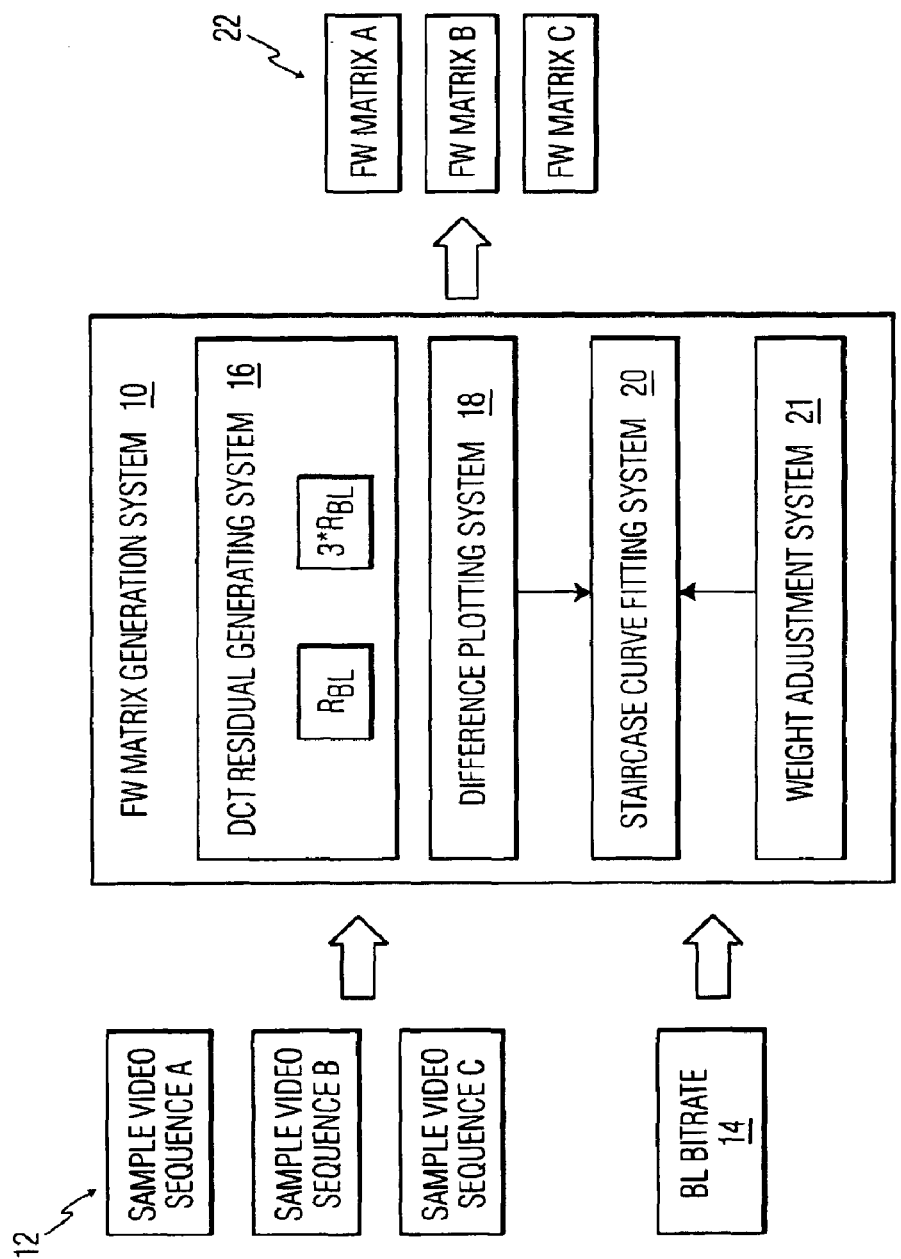
FIG. 1 depicts a block diagram of a FW Matrix Generation System in accordance with an embodiment of the present invention.

Referring now to the drawings, FIG. 1 depicts a Frequency Weighting (FW) Matrix Generation System 10 that receives one or more sample video sequences 12 and a base layer (BL) bit-rate 14, and outputs a set of FW matrices 22. Each sample video sequence 12 includes a unique scene type or characteristic that might typically be processed by a Fine-Granularity-Scalability (FGS) system, such as that sown in FIG. 2. Thus, for example, "Sample Video Sequence A" might comprise a high activity scene, "Sample Video Sequence B" might comprise a medium activity scene, and "Sample Video Sequence C" might comprise a low activity scene.

FW Matrix Generation System 10 generates a unique FW matrix for each inputted sample video sequence, so that each FW matrix is associated with a predetermined scene type. Thus, for instance, FW matrix A would correspond to a high activity scene, FW matrix B would correspond to a medium activity scene, and FW matrix C would correspond to a low activity. The number of FW matrices 22 generated can vary depending on the anticipated FGS application. Simple applications, such as a videophone, may require only single matrix derived from a low activity, low motion sample video sequence. Other more complicated applications may require a database of matrices to handle many different scene types. Moreover, any criteria (e.g., activity, motion, brightness, etc.) within a scene can be used to distinguish one sample video sequence (and therefore FW matrix) from another.

In the embodiment of FIG. 1, FW matrix generation system 10 utilizes a DCT residual generating system 16, a residual difference plotting system 18, a staircase curve fitting system 20, and a weight adjustment system 21 to generate FW matrices 22. The operations of these systems are described in further detail below.

FW matrix generation system 10 determines weights for each matrix from a staircase curve match of the difference of the average discrete cosine transform (DCT) residuals of a sample video frame calculated at critical bit-rates that generally include: (1) a selected bit-rate, and (2) a multiple of the selected bit-rate. The critical bit-rates can be selected as any value depending on, e.g., the particular application, resolution/size, frame rate, etc.

Figure 4:
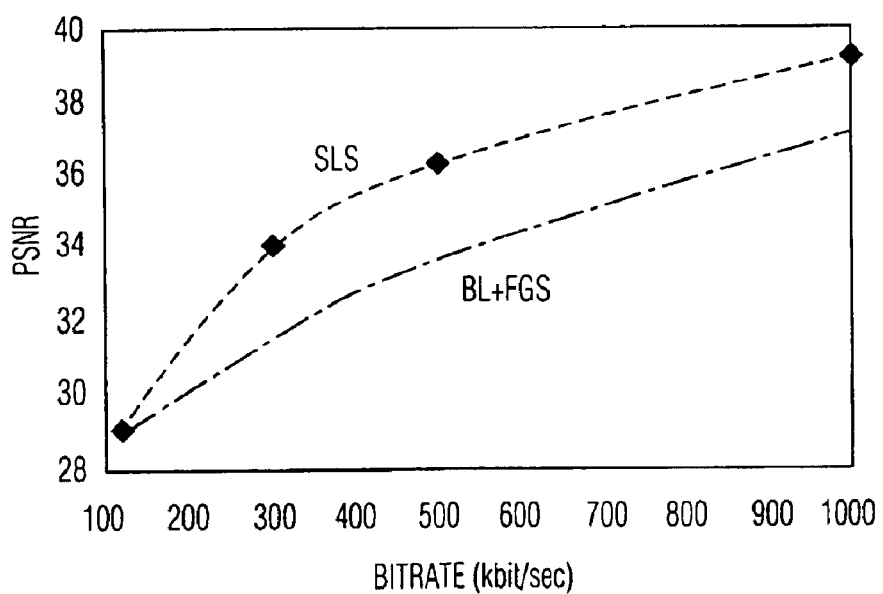
FIG. 4 depicts a graph comparing the objective quality of a Foreman video sequence encoded using FGS+BL and single layer switching (SLS).

In an exemplary embodiment, the critical bit-rates comprise the base layer coding bit-rate ($R_{BL}$) 14, and three times the base layer coding bit-rate (i.e., $3*R_{BL}$). Various experiments have shown that the largest quality gap between SLS and FGS appears at approximately three times the FGS BL bit-rate. For instance, the following analysis on a "Foreman" sequence shows that the $R_{BL}$ and $3*R_{BL}$ are critical bit-rates. FIG. 4 shows the peak signal-to-noise ratio (PSNR) of a "Foreman" video sequence encoded with a non-scalable coder (i.e., SLS-single layer switching) and with an FGS encoder having a base layer bit-rate of 100 kbps. As can be seen, in the 100 kbps–1 Mbps bit-rate range, the largest PSNR quality penalty gap between FGS and a non-scalable coder is around 300 kbps. Thus, FGS and SLS has a critical quality gap at $3*R_{BL}$. Hence, in this embodiment, the FW matrix selection is based on the average DCT residual values at critical quality bit-rates $3*R_{BL}$ and $R_{BL}$, and the FW matrix selected using DCT residuals at these bit-rates should have a higher impact than ones selected at other bit-rates. It should be understood that other critical quality bit-rates and/or multiples of $R_{BL}$ (e.g., 2.5, 3.5, 4, 4.5, etc.) could be utilized to define the critical quality gap without departing from the scope of the invention.

Figure 5:
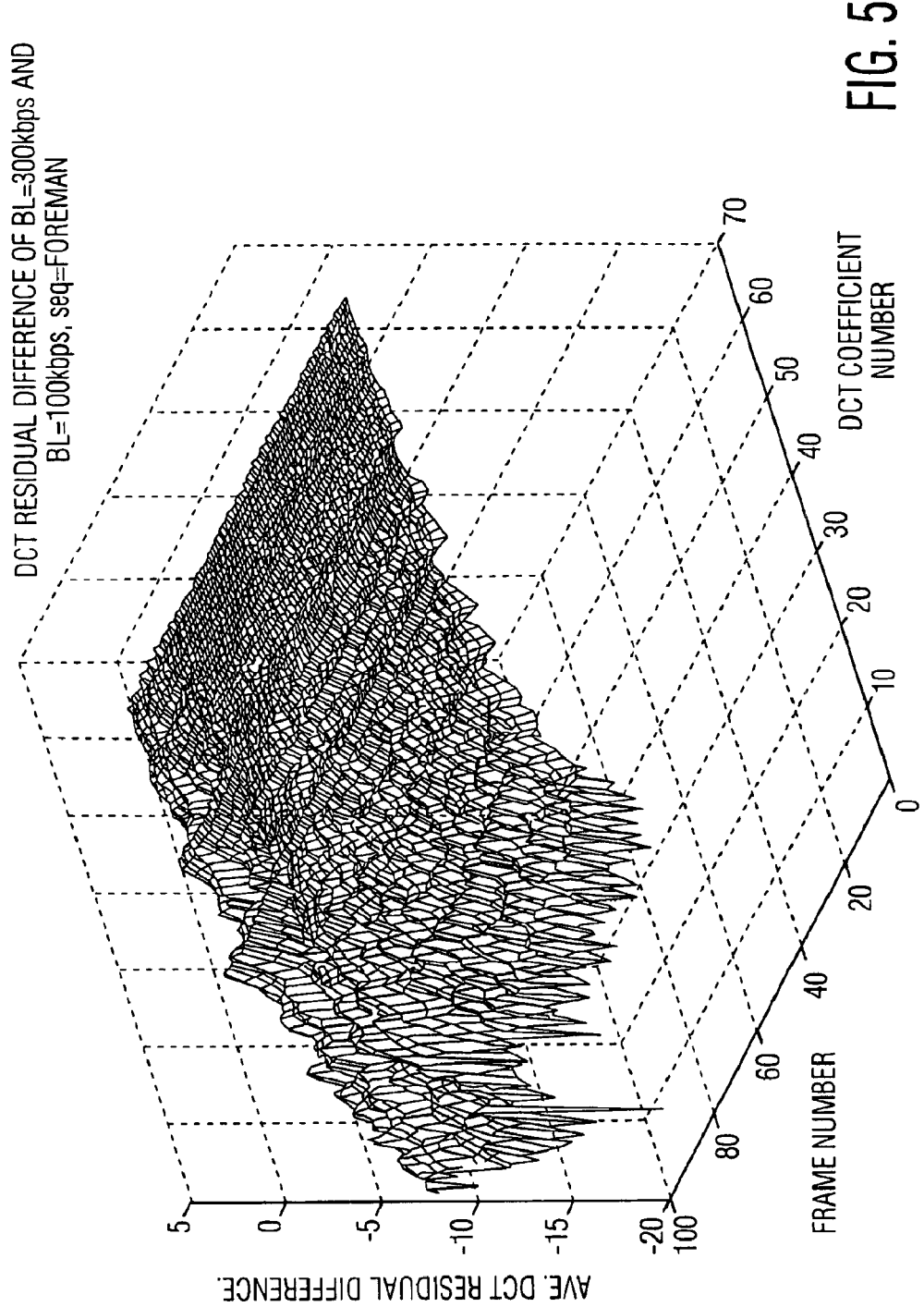
FIG. 5 depicts a graph showing DCT residual differences of BL coding at 100 kbps and 300 kbps for the Foreman video sequence.

FIG. 5 shows a 3-D mesh of frame-based difference of the average residual of the "Foreman" sequence at bit-rates of 100 kbps and 300 kbps. In this case, there are two scene types for the "Foreman" sequence. It is clear that for a particular scene characteristic, the residual characteristics are similar for all frames within the scene. Hence, a single frame from a sample video sequence can be utilized to generate the FW matrix for all the frames that have the similar scene characteristics.

Referring back to FIG. 1, the operation of FW matrix generation system 10 is described as follows. DCT residual generating system 16 generates (and plots) the average DCT residuals of a selected frame of the inputted video sequence at the critical quality bit-rates, in this case, $R_{BL}$ and $3*R_{BL}$. The average DCT residuals for each are plotted as a function of their location in a block of DCT data. Preferably, the residuals are extracted in a zigzag line from top left to bottom right (i.e., "DCT zigzag scan line") to follow the energy dissipation trend. In the example shown here, coefficient numbers 1–64 provide the zigzag location for each residual inside an 8×8 DCT block.

| 1 | 2 | 6 | 7 | | 15 | 16 | 28 | 29 |
|---|---|---|---|---|---|---|---|---|
| 3 | 5 | 8 | 14 | | 17 | 27 | 30 | 43 |
| 4 | 9 | 13 | 18 | | 26 | 31 | 42 | 44 |
| 10 | 12 | 19 | 25 | | 32 | 41 | 45 | 54 |
| – | – | – | – | + | – | – | – | – |
| 11 | 20 | 24 | 33 | | 40 | 46 | 53 | 55 |
| 21 | 23 | 34 | 39 | | 47 | 52 | 56 | 61 |
| 22 | 35 | 38 | 48 | | 51 | 57 | 60 | 62 |
| 36 | 37 | 49 | 50 | | 58 | 59 | 63 | 64 |

Figure 6:
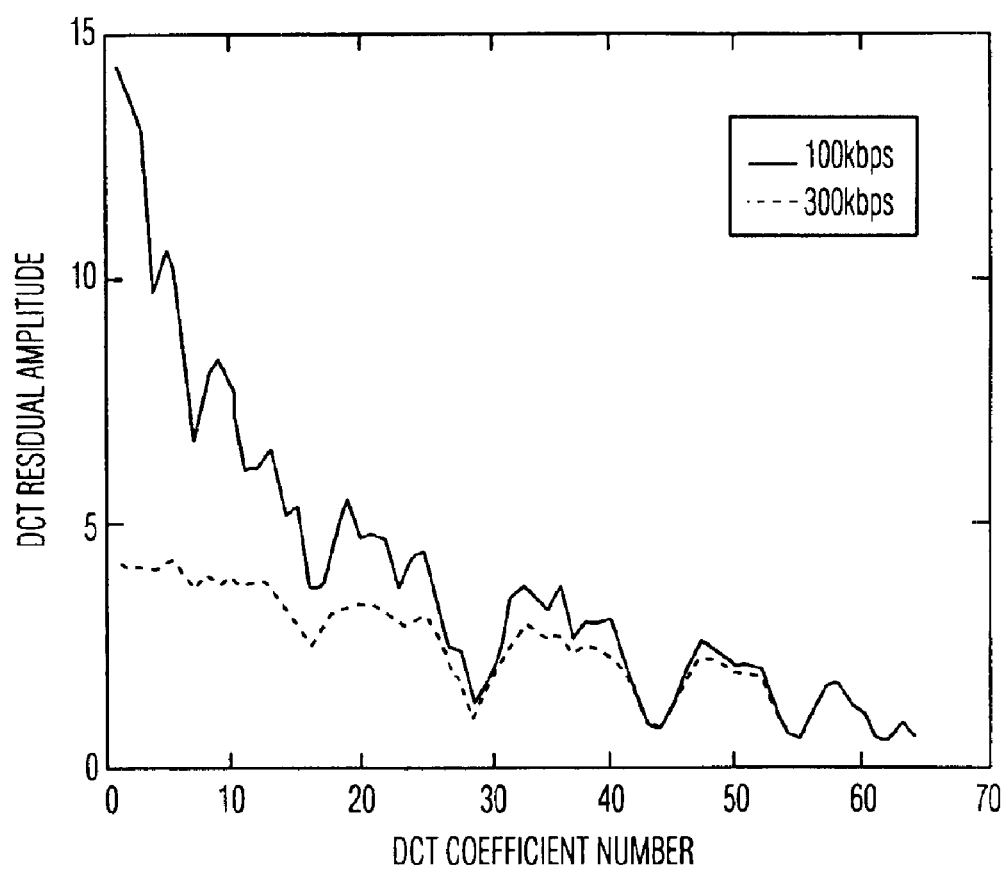
FIG. 6 depicts a plot of DCT residual amplitudes for a single video frame coded at 100 kbps and 300 kbps, respectively, of the Foreman video sequence.

The 64 residual values would then be plotted as shown in FIG. 6. FIG. 6 shows an exemplary plot of the 50th frame of the "Foreman" sequence of FIG. 5 at SLS coding bit-rates of 100 kbps and 300 kbps coded with an MPEG-4 non-scalable coder. From FIG. 6, it can be seen that the profiles of the DCT coefficient residuals at the two bit-rates are especially different for the lower frequency residuals. If the residual of the SLS at 100 kbps is coded in FGS enhancement layer, comparing the FGS and SLS at 300 kbps, it is clear that the quality gap between the FGS and the SLS coding are caused by the bit-plane cut-off of the FGS residuals at the transmission side. However, if the low frequency residuals get higher priority in the bit-plane coding through FW, the same bit-plane cut-off at the transmission side will result in smaller loss of the low frequency residuals at the receiver side, which in turn will bring better output quality for the FGS layer. The FW amount is dominated by the residual difference between these two bit-rates. The more the lower frequency residuals get compensated, the smaller the quality gap between the FGS and SLS at 300 kbps.

Figure 7:
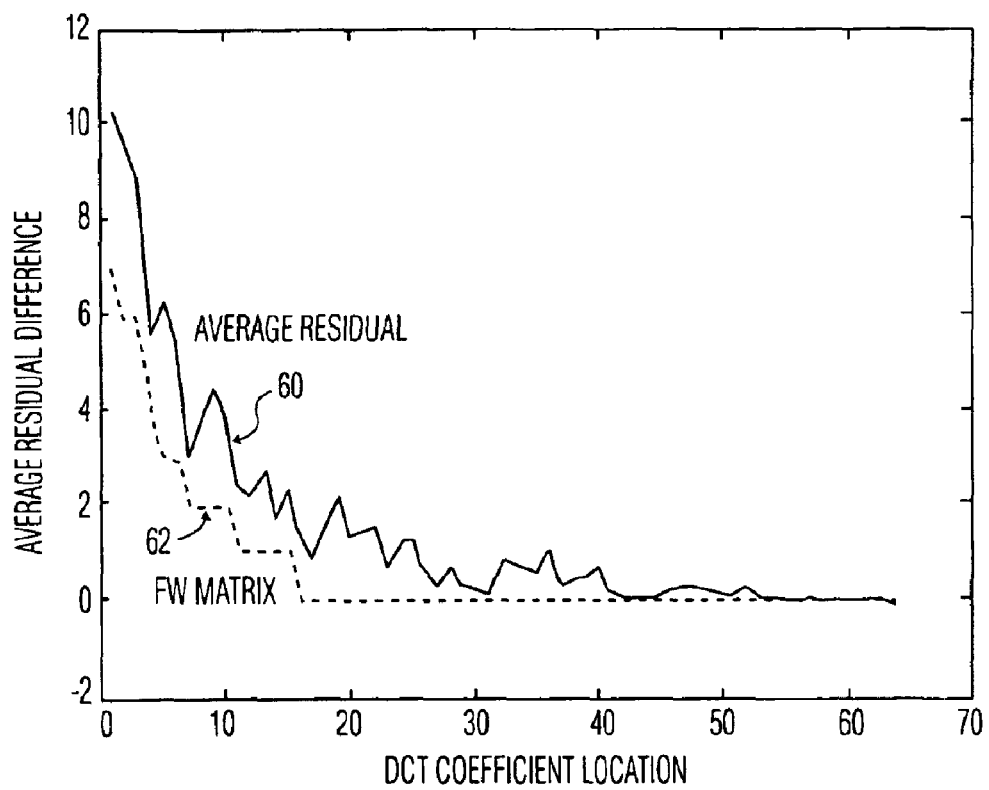
FIG. 7 depicts the average residual difference of the plots of FIG. 6 along with a matching staircase curve.

Next, difference plotting system 18 (FIG. 1) plots the difference of the average residual of the two DCT residual plots. FIG. 7 depicts an exemplary plot that shows the difference curve 60 of the average residuals for the two plots of FIG. 6 (i.e., the plot at 100 kbps minus the plot at 300 kbps). The difference curve 60 is plotted by DCT coefficient locations corresponding to a DCT zigzag scan line, as shown above. Staircase curve fitting system 20 then matches a staircase curve 62 to the difference curve 60.

Using the residual difference of the average DCT residuals based on two different bit-rates (e.g. 100 kbps and 300 kbps bit-rate) as a guideline, the FW matrix weights are selected using the staircase curve 62 matched to the shape of the residual difference. The matched staircase values for each DCT coefficient are then mapped into a FW matrix in the same zigzag configuration as described above. For example, in a four quadrant matrix made up of 64 elements arranged in a zigzag line from top left to bottom right to follow the energy dissipation, the DCT coefficient weights from the staircase curve would be arranged in the FW matrix as follows:

```
 1  2  6  7 | 15 16 28 29
 3  5  8 14 | 17 27 30 43
 4  9 13 18 | 26 31 42 44
10 12 19 25 | 32 41 45 54
- - - - + - - - -
11 20 24 33 | 40 46 53 55
21 23 34 39 | 47 52 56 61
22 35 38 48 | 51 57 60 62
36 37 49 50 | 58 59 63 64
```

An exemplary FW matrix containing actual coefficient values would looks as follows:

$$\begin{bmatrix} 4 & 4 & 3 & 3 & 2 & 1 & 1 & 0 \\ 4 & 3 & 3 & 2 & 1 & 1 & 0 & 0 \\ 3 & 3 & 2 & 1 & 1 & 0 & 0 & 0 \\ 3 & 2 & 1 & 1 & 0 & 0 & 0 & 0 \\ 2 & 1 & 1 & 0 & 0 & 0 & 0 & 0 \\ 1 & 1 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 0 \end{bmatrix}$$

It is noted that the total number of bit-planes adopted in the system implementation may limit the weights of the FW matrix. In particular, when one or more of the weights selected by the staircase match are larger than the upper limit of the total number of bit-planes, the weights must be normalized by weight adjustment system 21. For instance, in FIG. 6, the first DCT coefficient has a weight of seven. However, if the number of bit-planes were limited to six, the weight of the first coefficient would exceed the upper limit. In this case, weight adjustment system 21 would modify the generated staircase curve by essentially shifting it to the left until the weight of the first coefficient equaled the upper limit of the total number of available bit-planes. In this manner, the normalized staircase curve is kept in parallel with the original staircase curve. It is understood that other adjustment algorithms could likewise be used without departing from the scope of the invention.

Figure 8:
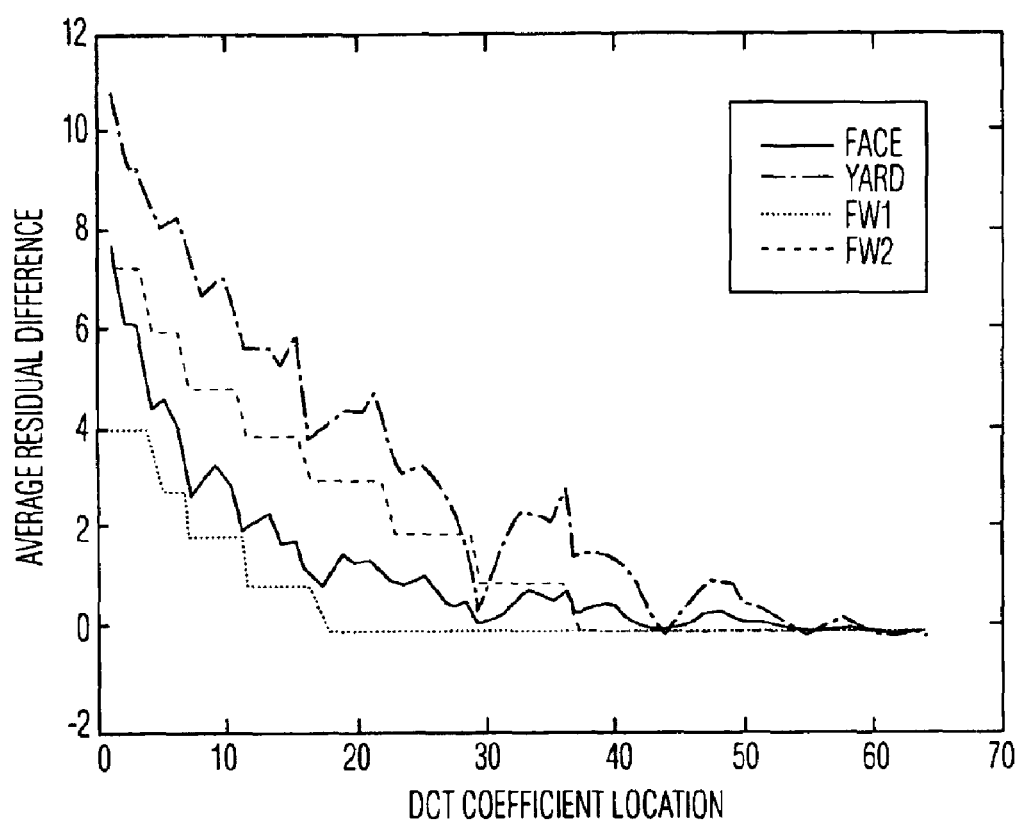
FIG. 8 depicts the average residual difference and matching staircase for two different video sequences.

Two exemplary staircase matched FW matrices for two different scenes of the "Foreman" sequences (i.e., an outdoor yard scene and a face scene) are shown in FIG. 8.

Figure 2:
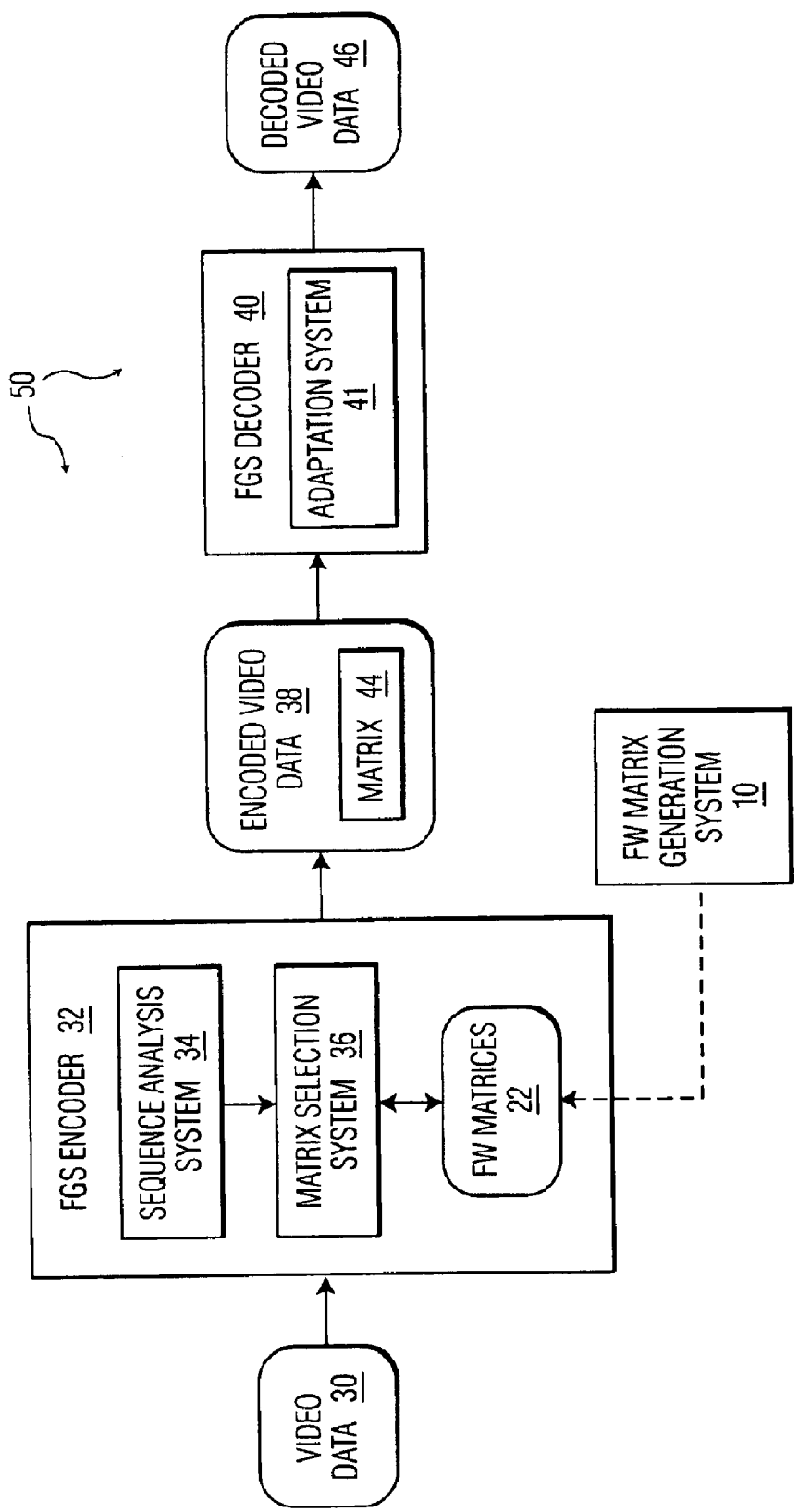
FIG. 2 depicts a block diagram of an FGS encoder and FGS decoder in accordance with an embodiment of the present invention.
Figure 3:
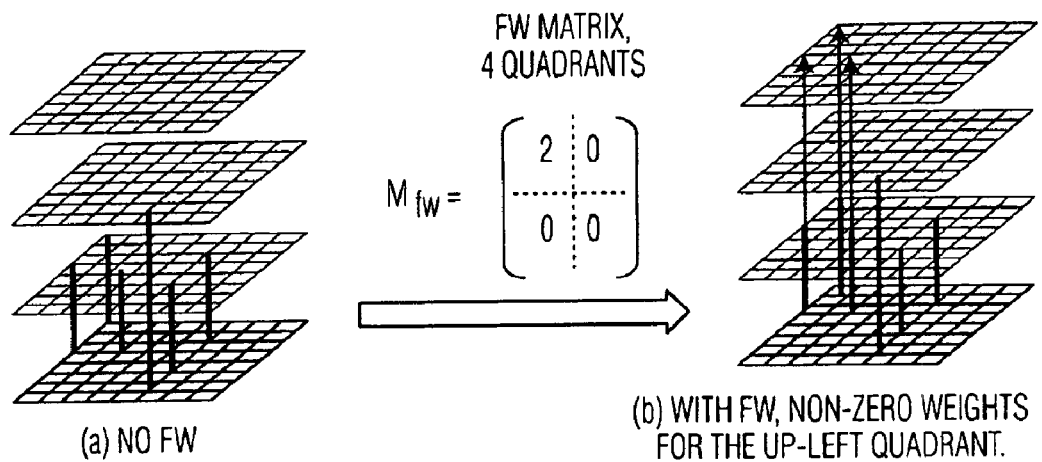
FIG. 3 depicts an exemplary frequency weighting bitplane.

Referring to FIG. 2, an FGS enhancement layer coding system 50 is shown comprising: (1) an FGS encoder 32 for encoding video data 30, and (2) an FGS enhancement layer decoder for decoding encoded enhancement layer video data 38 and generating decoded video data 46. FGS encoder 32 includes a sequence analysis system 34, a matrix selection system 36, and a set of FW matrices 22 that were generated from FW Matrix Generation System 10, as described above. Sequence analysis system 34 examines the incoming video data 30 to determine one or more scene characteristics (e.g., high activity, low brightness, etc.). Matrix selection system 36 then selects a matrix from the set of FW matrices 22 that corresponds to the scene characteristics. The selected FW matrix 44 is then used to encode video data 30, and the selected FW matrix 44 is also included in the outputted sequence header of encoded enhancement layer video data 38. As the scene characteristics change, a new FW matrix 44 can be updated and re-transmitted.

Each FW matrix is selected for one type of scene. Therefore, if a scene change is not detected, the FW matrix selection only needs to be conducted once. When a scene change (or residual characteristics change) happens, the FW matrix needs to be re-selected and transmitted.

Scene changes may be identified by analyzing scene characteristics, such as brightness, motion, activity, etc., in EL data. A robust scene change detection algorithm can be used to adapt the FW matrix on the sequence characteristics, for instance, by employing motion-vectors, complexity measures $X_i$, temporal correlation calculations or combinations of these. These scene characteristics parameters do not add significant complexity since parameters already computed in the base-layer coding/rate-control can be reused.

Referring again to FIG. 2, FGS Enhancement Layer Decoder 40 is depicted for receiving and decoding the encoded enhancement layer video data 38. As noted, the selected FW matrix 44 is transmitted in the sequence header along with the encoded enhancement layer video data 38, and is used by the FGS decoder 40 to process and decode the encoded enhancement layer video data 38. When a new FW matrix is received and decoded, adaptation system 41 replaces the old FW matrix and the new FW matrix is used to decode the following video bit stream.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claimed is:

1. A system for generating a frequency weighting (FW) matrix for use in a Fine-Granularity-Scalability (FGS) video coding system, comprising:
    a system for generating average discrete cosine transform (DCT) residuals for a sample video frame encoded both at a predetermined base layer bit-rate and at approximately three times the predetermined base layer bit-rate;
    a system for plotting a difference curve of the generated average DCT residuals, wherein the difference curve is plotted by DCT coefficient locations corresponding to a DCT zigzag scan line; and
    a system for matching a staircase curve to the difference curve.

2. The system of claim 1, wherein values on the staircase curve at each DCT coefficient location are mapped into the FW matrix at locations corresponding to the DCT zigzag scan line.

3. The system of claim 2, further comprising a weight adjustment system for altering the staircase curve when the weights determined from the staircase curve are larger than an upper limit of a number of bit planes in the FGS video coding system.

4. The system of claim 1, wherein the sample video frame is selected from a sample video sequence having a predetermined scene characteristic.

5. The system of claim 4, wherein the predetermined scene characteristic comprises a criterion selected from a group consisting of: a brightness level, a motion level, and an activity level.

6. The system of claim 1, wherein the predetermined base layer bit-rate is application, resolution, and frame rate dependent.

7. A method of generating a frequency weighting (FW) matrix for use in a Fine-Granularity-Scalability (FGS) video coding system, comprising the steps of:
    generating a first plot of average discrete cosine transform (DCT) residuals versus a zigzag DCT scan line location for a sample video frame encoded at a first bit-rate;
    generating a second plot of average discrete cosine transform (DCT) residuals versus the zigzag DCT scan line location for the sample video frame encoded at a multiple of the first bit-rate;
    generating a difference curve of the first and second plot;
    matching a staircase curve to the difference curve; and
    mapping weights from the staircase curve to populate the FW matrix.

8. The method of claim 7, wherein the first bit-rate comprises a base layer bit-rate.

9. The method of claim 8, wherein the multiple comprises three times the base layer bit-rate.

10. The method of claim 7, comprising the further step of normalizing the staircase curve when the mapped weights determined from the staircase curve are larger than an upper limit of a number of bit planes in the FGS video coding system.

11. The method of claim 7, wherein the sample video frame is selected from a sample video sequence having a predetermined scene characteristic.

12. A Fine-Granularity-Scalability (FGS) video encoding system that utilizes a frequency weighting (FW) matrix to encode video data, comprising:
    a system for determining a scene characteristic of the video data; and
    a system for selecting an FW matrix from a plurality of FW matrices based on the determined scene characteristic.

13. The FGS video encoding system of claim 12, wherein each of the plurality of FW matrices are associated with one of a plurality of predetermined scene characteristics.

14. The FGS video encoding system of claim 13, wherein weights for each matrix are determined from a staircase curve match of the average discrete cosine transform (DCT) residuals calculated at a first and second critical quality bit-rate for a sample video frame.

15. The FGS video encoding system of claim 14, wherein the first and second critical quality bit-rates comprise a base layer bit-rate and three times the base layer bit-rate.

16. The FGS video encoding system of claim 14, wherein the sample video frame was derived from a video sequence having one of the plurality of predetermined scene characteristics.

17. The FGS video encoding system of claim 12, wherein the determined scene characteristic comprises a criterion selected from a group consisting of: a brightness level, a motion amount, and an activity level.

18. A program product stored on a recordable medium for generating a frequency weighting (FW) matrix for use in a Fine-Granularity-Scalability (FGS) video coding system, the program product comprising:
    means for generating a first plot of average discrete cosine transform (DCT) residuals versus zigzag DCT scan line locations for a sample video frame encoded at a first bit-rate;
    means for generating a second plot of average discrete cosine transform (DCT) residuals versus zigzag DCT scan line locations for the sample video frame encoded at a multiple of the first bit-rate;
    means for generating a difference curve of the first and second plot;
    means for matching a staircase curve to the difference curve; and
    means for populating the FW matrix with weights mapped from the staircase curve.

19. The program product of claim 18, wherein the first bit-rate comprises a base layer bit-rate, and wherein the multiple comprises three times the base layer bit-rate.

20. The program product of claim 18, further comprising means for normalizing the staircase curve when the weights determined from the staircase curve are larger than an upper limit of a number of bit planes in the FGS coding system.

21. A Fine-Granularity-Scalability (FGS) video decoding system that utilizes a frequency weighting (FW) matrix to decode encoded video data, wherein weights for the FW matrix are determined from a staircase curve match of the difference of the average discrete cosine transform (DCT) residuals calculated at a base layer bit-rate and approximately three times the base layer bit-rate for a sample video frame.

22. The FGS video decoding system of claim 21, further comprising a system for adaptively changing the FW matrix when a scene characteristic changes.

* * * * *